UNITED STATES PATENT OFFICE.

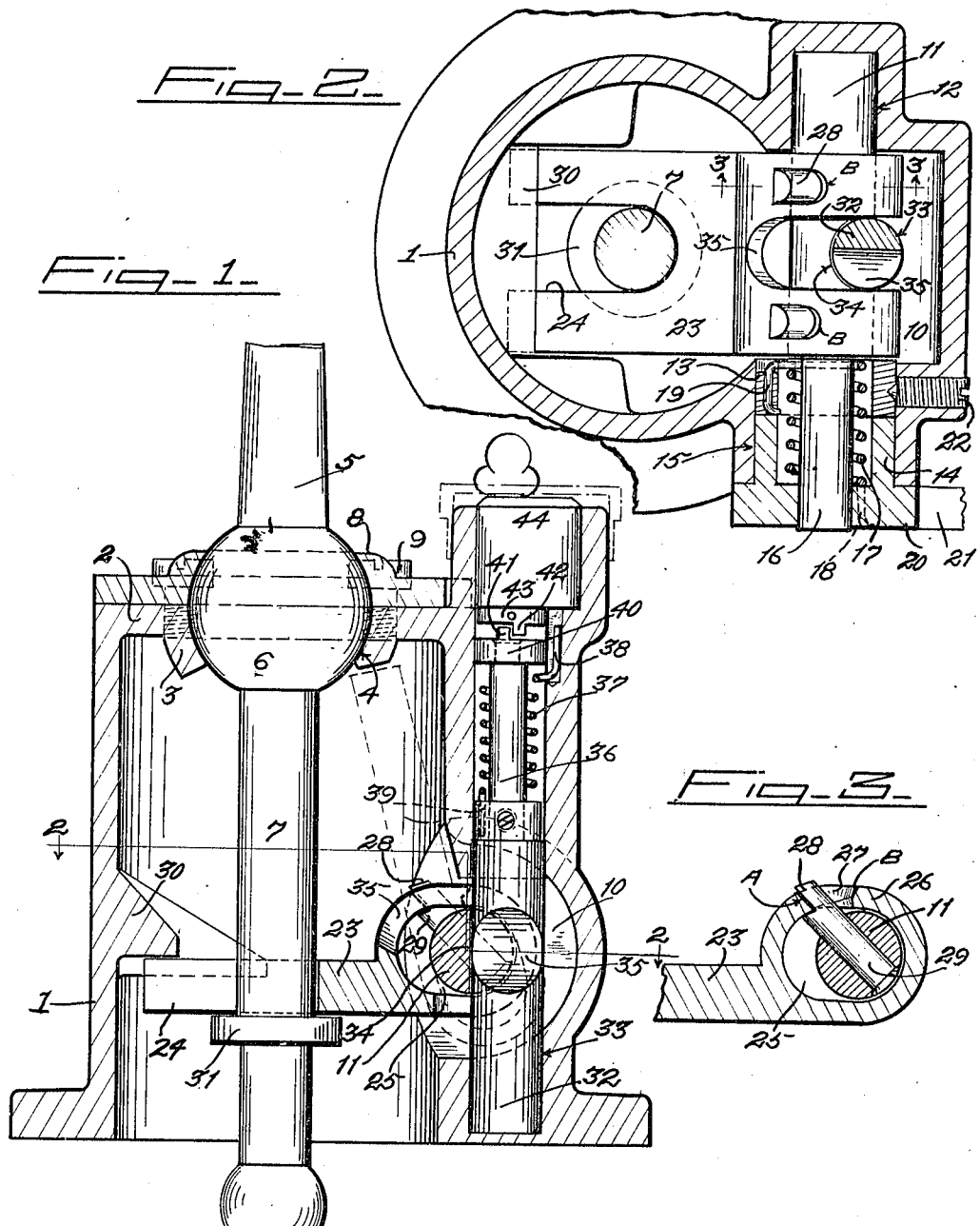

GEORGE C. JENSEN, OF OAKLAND, CALIFORNIA.

SHIFT-LEVER-LOCKING DEVICE.

1,292,328.        Specification of Letters Patent.      Patented Jan. 21, 1919.

Application filed February 13, 1918. Serial No. 216,964.

*To all whom it may concern:*

Be it known that I, GEORGE C. JENSEN, a citizen of the United States, residing at Oakland, in the county of Alameda and State of California, have invented certain new and useful Improvements in Shift-Lever-Locking Devices, of which the following is a specification.

In the present invention I have designed a construction adapted for operation to lock a universally fulcrumed lever from movement within its socket and at the same time to prevent the lever from being removed from its fulcrum when in locked position.

The invention consists primarily in a locking plate pivotally mounted at one side for swinging movement and adapted when swung into a certain position for longitudinal movement to permit the free end thereof to engage under a stop lug, the plate overlying a portion of the lever whereby the lever is prevented from operative movement or removal from its fulcrum.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a vertical sectional view of the preferred embodiment of my invention.

Fig. 2 is a transverse sectional view taken on line 2—2 of Fig. 1 and viewed in the direction of the arrows.

Fig. 3 is a view in detail of the operating mechanism for the locking plate taken on line 3—3 of Fig. 2.

Referring more particularly to the several views of the drawings, wherein like characters of reference designate corresponding parts, the numeral 1 indicates a tubular casing formed at its upper end with an annular wall 2 downwardly flanged or cupped as at 3, providing a socket 4 which provides a fulcrum point for a lever 5. The lever is inserted downwardly into said casing 1 until the spherical portion 6 thereof rests in said socket 4 with the lower portion 7 of the lever depending into said casing and inclosed thereby.

A suitable retaining plate or ring 8 is positioned downwardly over the upper end of the lever 5 and secured by suitable means such as screws 9 to the upper surface of the flange 2, said plate providing a retaining means for holding the spherical portion 6 of the lever within the socket 4.

The casing 1 is provided in one of its side walls with a suitable chamber 10 communicating with the interior of the casing 1 and transversely of said chamber is disposed a suitable axially rotatable shaft 11, one end of which is received in the bearing 12 and the other end of which extends through a suitable annular collar 13 and cup 14, the collar and cup being positioned within a bore 15 formed in the side wall of said chamber 10. The portion of the shaft 11 extending into said collar 13 and cup 14 is reduced forming a spindle 16 and surrounding said spindle is a coiled spring 17 secured at one end, as at 18, to the cup, and at its opposite end, as at 19, to the collar 13. The flanged end 20 of the cup 14 is provided with an operating handle 21 and the portion of the spindle extending through said cup is locked thereto in any suitable manner, so that on the operation of the handle 21 the spindle 16 and shaft 11 will be axially rotated.

A set screw 22 passing through the wall of the casing 1 maintains the collar 13 from rotation within the bore 15.

Within the tubular casing 1 is positioned a locking plate 23 slotted at its outer free end, as at 24, and formed at its rear end with a transversely disposed elongated bolt receiving opening 25 through which passes the bolt 11. The upper portion of the wall 26 surrounding the opening 25 is ported as at 27, and extending into said ports are the reduced ends 28 of actuating pins 29 disposed transversely through the shaft 11. The openings 27 are elongated and of a length to permit of a free movement of the ends 28 of pins 29 therein, whereby two distinct movements are imparted to the locking plate on the rotation of the shaft 11. When the locking plate is in the position as in the drawings, and it is desired to throw the same to dotted line position, as in Fig. 1, the axial rotation of the shaft 11 will first cause the end 28 of the pins 29 to contact with the end B of the openings 27 and further movement will cause a lineal movement of the locking plate, this being permitted by the elongation of the opening 25, and a still further rotation of the shaft will cause an upward swinging movement of the free end of said locking plate, said shaft 11 providing the fulcrum therefor. On the downward movement of the plate, that is from the dotted line position in Fig. 1 to the full line position as in the drawings, the reverse of the above described operation takes place, that is the free end of the plate is swung downwardly and further rotation of the shaft 11 forces the end 28 of pins 29 into engagement with the end A of the slot 27, causing a lineal or longitudinal movement of said plate.

The plate 23 when in its locked position is adapted to receive the lower end 7 of the lever in the slot 24, and on the imparting of longitudinal movement to the plate the free end thereof is adapted for projecting beyond the stationary stop lug 30 inwardly projected from the inner side of the casing wall 1 directly opposite the shaft 11. The lower portion of the lever 7, at a point below the stop lug 30 is provided with an annular flange 31 to lie below the end surface of the locking plate when the same is in locked position, as in the drawings.

It will be apparent that when the locking plate 23 is in locked position, as in the drawings, the free end thereof extends under the stop lug 30 which prevents upward movement of the plate, and said plate overlies the flange 31 on the lever with the portion 7 of the lever received in the slot 24, which positioning prevents operative movement of the lever within its socket or upward movement of the lever from its socket 4 should the retaining ring 8 be detached from the flange 2.

The plate 23 is adapted to be locked from movement when in its locked position, as in the drawings, and to accomplish this any suitable mechanism may be employed. However, the preferred form consists of an axially rotatable vertically disposed locking bolt 32 positioned within a vertical bore 33 formed in the side wall of the casing 1, and passing through the chamber 10. The bolt 32 intersects the axis of rotation of the shaft 11, the periphery of the bolt being received in a cutout 34 in the side wall of the bolt intermediate the longitudinal slot 35 in the plate 23. At the point of intersection with the shaft 11, the bolt 32 is provided with a depression 35 for receiving the solid portion of the shaft 11 when the same is axially rotated to position the locking plate 23 in dotted line position—Fig. 1.

The reduced portion 36 of the bolt 32 is surrounded by a coiled spring 37, one end of which is secured as at 38 to the casing 1, and the opposite end is secured, as at 39, to the bolt, said spring axially rotating said locking bolt to normally maintain the same in the position as in the drawings.

The upper end of the bolt 32 is provided with a head 40 carrying the upwardly projecting lug 41 disposed eccentrically thereof, and with which is adapted for engagement a lug 42 carried by an axially rotatable locking barrel 43 mounted within a casing 44, closing the upper end of the vertical bore 33. The locking barrel 43 is of the universally used key controlled type and on the rotation of the same in a clockwise direction the lug 42 thereon will engage the lug 41 and axially rotate the locking bolt 32, withdrawing the peripheral surface thereof from the recess 34 of the shaft 11 and aline the depression 35 thereof with the depression 34 of the bolt 11 at which time the spring 17 axially rotates the shaft 11 to operate the locking plate from locked or operative to unlocked or inoperative position as illustrated in dotted lines—Fig. 1 of the drawings.

On the manual operation of the handle 21 against the tension of the spring 17, the bolt 11 is axially rotated to swing the locking plate 23 from dotted to full line position as in Fig. 1 of the drawings, and to longitudinally move the same to project the free end thereof under the stop lug 30. When in this position the peripheral surface of the bolt 11 is removed from the recess 35 of the bolt 32, permitting the spring 37 to axially rotate the bolt 32 in an anti-clockwise direction and position the solid portion thereof in the recess 34 of the shaft 11, thus automatically locking the locking plate in operative or locking position.

Having thus described my invention, what I claim as new and desire to protect by Letters Patent is:—

1. In combination with a casing, a lever extending thereinto and fulcrumed within its length therein for movement, a stop lug within said casing, a locking plate within said casing and mounted for movement to engage said lever and to project under said stop lug, whereby said lever is locked from operative movement, and means associated with the lever for lying beneath said plate for precluding movement of said lever from its fulcrum when said plate is in the latter position.

2. In combination with a casing, a lever extending thereinto and fulcrumed within its length therein for movement, said lever provided with an enlarged portion adjacent its lower end, a stop lug within said casing, a slotted locking plate within said casing and mounted for swinging movement to embrace said lever and overlie said enlarged portion with its free end beneath said stop, whereby said lever is locked from operative movement within or removal from its fulcrum.

3. In combination with a casing, a lever extending thereinto and fulcrumed within its length therein for movement, said lever provided with an enlarged portion adjacent its lower end, a stop lug within said casing, a locking plate within said casing and mounted for swinging movement to embrace said lever and for longitudinal movement to project under said stop lug, said plate when embracing said lever overlying the said enlarged portion, whereby said lever is locked from operative movement within or removal from its fulcrum.

4. In combination with a casing, a lever extending thereinto and fulcrumed within its length therein for movement, said lever provided at a point within said casing with an enlarged portion, a stop lug within said casing, a forked locking plate within said casing and capable of pivotal and longitudinal movement therein, means coöperating with said plate for moving the same longitudinally into and out of engagement with said lug and for swinging the same on a horizontal axis relatively to said lever whereby said plate when in locked engagement with said lever embraces the same above said enlarged portion and projects under said lug preventing operative movement of the lever or the removal of the same from its fulcrum.

5. A casing, a lever extending thereinto and fulcrumed within its length therein for movement, means for locking said lever from movement on its fulcrum, comprising a fixed stop lug, a forked locking plate within said casing and capable of pivotal movement to embrace said lever and of longitudinal movement to project beneath said lug, and lock controlling means for controlling the operation of said plate.

6. A casing, a lever extending thereinto and fulcrumed within its length therein for movement and provided within said casing with an enlarged portion, means for locking said lever from operative movement on its fulcrum or removal therefrom comprising a fixed stop lug, a forked locking plate within said casing and capable of pivotal movement to embrace said lever above said enlarged portion and of longitudinal movement to project beneath said lug, and a lock controlled means for controlling the operation of said plate.

7. A casing, a lever extending thereinto and fulcrumed within its length therein for movement and provided within said casing with an enlarged portion, means for locking said lever from swinging movement on its fulcrum or removal therefrom comprising a fixed stop lug, a forked locking plate within said casing and provided at one end with a transversely disposed opening, an axially rotatable member carried by the casing and coöperating with the plate through said opening and providing a fulcrum therefor, said plate capable of longitudinal movement transversely of said member, means carried by said rotatable member and having coöperative engagement with said plate and adapted on the rotation of said member to pivot said plate on its fulcrum and to move the same into and out of coöperative engagement with said stop lug dependent on the direction of rotation of said member.

8. A casing, a lever extending thereinto and fulcrumed within its length therein for movement and provided within said casing with an enlarged portion, means for locking said lever from movement on its fulcrum or removal therefrom comprising a fixed lug carried by the interior of said casing, a forked locking plate within said casing and capable of pivotal and longitudinal movement therein, a shaft coöperating with said plate and providing a fulcrum therefor, said plate adapted when in unlocked position to lie without the sphere of operative movement of said lever, said shaft when operated first swinging the free end of said plate downwardly to embrace said lever above said enlarged portion and thence imparting longitudinal movement thereto to position the free end thereof beneath said lug, and lock controlled means for controlling the operation of said shaft.

9. A casing, a lever extending thereinto and fulcrumed within its length therein for movement and provided within said casing with an enlarged portion, means for locking said lever from movement on its fulcrum or removal therefrom comprising a lug within said casing, a slotted locking plate within said casing, an axially rotatable lock controlled shaft mounting said plate and capable of operation to swing said plate to embrace the lever at a point above said enlarged portion and to project beneath said lug.

10. A casing, a lever fulcrumed therein for swinging movement, means for locking said lever from movement on its fulcrum, comprising a shoulder within said casing, a slotted locking plate within said casing, and an axially rotatable lock controlled shaft mounting said plate and capable of operation to swing the same to embrace the lever and to position the free end thereof to project under said shoulder.

11. In combination with a pivotally mounted gear shifting element, means for mounting the same, means for locking the element from movement on its fulcrum, comprising a projecting portion, a bifurcated locking plate within said mounting means, and an axially rotatable shaft mounting said plate and capable of operation to swing the same to embrace the element and to position the free end thereof under said projecting portion.

In testimony whereof I have signed my name to this specification in the presence of two subscribing witnesses.

GEORGE C. JENSEN.

Witnesses:
D. B. RICHARDS,
HARRY A. TOTTEN.

Copies of this patent may be obtained for five cents each, by addressing the "Commissioner of Patents, Washington, D. C."